Patented Aug. 8, 1944

2,355,319

UNITED STATES PATENT OFFICE 2,355,319

STABILIZATION OF HALOBUTENES

Rupert C. Morris, Berkeley, and Edward C. Shokal, Oakland, Calif., assignors to Shell Development Company, San Francisco, Calif., a corporation of Delaware No Drawing. Application January 11, 1943, Serial No. 472,087

11 Claims. (Cl. 260—652.5)

This invention relates to a method for preventing or inhibiting the decomposition of the halobutenes which contain a halogen atom linked to an unsaturated carbon atom under conditions encountered during their transportation and storage. The invention also pertains to the stabilized halobutene compositions resulting from the application of such method.

The marked tendency of the halobutenes which contain a halogen atom linked to an unsaturated carbon atom, particularly 2-chlorobutene-2, to undergo decomposition during shipment and storage, particularly in the presence of small amounts of water, has been long recognized. While in general this tendency is most pronounced in metal containers, as copper or ferruginous containers, in many cases extensive decomposition may occur in glass as well. The decomposition whether occurring in glass or in metal imparts undesirable characteristics as bad odor and objectionable color to the packaged liquid which adversely affect its salability. In the case of metal containers the problem may be two-fold since substantial corrosion of the walls of the container may result.

The various inhibitors which have heretofore been proposed to suppress the deterioration of organic halides during shipment and storage while in some instances fairly effective are in general unsuitable for the stabilization of the halobutenes which contain a halogen atom linked to an unsaturated carbon atom either because of the large quantity of inhibitor which must be added or because of difficulties encountered in separating the inhibitor, when necessary, after it has served its purpose.

It has now been found that the deterioration of the halobutenes which contain a halogen atom linked to an unsaturated carbon atom, and particularly those, such as 2-chlorobutene-2, wherein the olefinic linkage is in the 2-position, may be effectively suppressed under ordinary conditions of shipment and storage by mixing therewith a relatively small amount of a compound selected from the group consisting of polyhydric alcohols and ethers of polyhydric alcohols. Examples of suitable polyhydric alcohols include ethylene glycol, diethylene glycol, propylene glycol, butylene glycol and other 1,2-glycols; glycerol, the alkyl substituted glycerols as the methyl glycerols, etc. Ethers of polyhydric alcohols which have application in the practice of the invention comprise the carbitols, the cellosolves, alpha and beta alkyl glycerol ethers, alpha and beta cycloalkyl glycerol ethers, alpha and beta aryl glycerol ethers, and the like.

The method of stabilizing halobutenes provided by the invention is applicable irrespective of the type of container in which the liquid is packaged, but is especially valuable in connection with the shipment and/or storage of these organic halides in ferruginous containers.

The invention is applicable to the stabilization of the halobutenes which contain a halogen atom linked to an unsaturated carbon atom. The olefinic linkage in the halobutene may be between the first and second carbon atoms (1 or alpha position), or it may be between the second and third carbon atoms (2 or beta position). The invention is of particular value and usefulness as applied to the stabilization of 2-chlorobutene-2 and the other 2-halobutenes wherein the olefinic linkage is in the two position. Such halobutenes may contain one or a plurality of halogen atoms linked to the unsaturated carbon atom or carbon atoms, and one or a plurality of halogen atoms may also be linked to saturated carbon atoms. The halogen atom or atoms present in the halobutene may be fluorine, chlorine, bromine or iodine. Representative halobutenes which may be stabilized in accordance with the invention are: 2-chlorobutene-2, 2-bromobutene-2, 2-iodobutene-2, 1,2-dichlorobutene-2, 2,3-dichlorobutene-2, 2,3-dibromobutene-2, 1,2,3-dichlorobutene-2, 1,2,4-dichlorobutene-2, 2-chlorobutene-1, 2-bromobutene-1, 1-chlorobutene-1, 2,3-dichlorobutene-1, 1-bromobutene-1, 2-iodobutene-1, 1,2-dichlorobutene-1 and 1,2,3-trichlorobutene-1.

Although the proportion or amount of inhibitor which is added to suppress the decomposition of the halobutenes according to the invention and to produce the novel compositions of matter encompassed thereby may vary within wide limits, it is preferred to add the smallest effective amount. This is usually between about 0.1% and about 5% by volume, depending inter alia upon the degree of instability of the particular halide being prepared for shipment or storage, the period over which the halide must be preserved, and the particular inhibitor which is being used.

The present invention has been found especially useful as a means of stabilizing 2-chlorobutene-2, large amounts of which are produced as a by-product during the synthesis of butadiene from dichlorobutane. 2-chlorobutene-2 is useful, for example, as an ingredient in paint removers and as a degreasing and extraction solvent.

When it is first recovered or prepared 2-chlorobutene-2 usually is clear and substantially water-white, and it has a sweet odor and does not give off hydrogen chloride fumes. However, when stored for even a relatively short period of time in glass containers the liquid develops a deep yellow color and has a sharp disagreeable odor. Storage in ferruginous containers displays its decomposition even more prominently, i. e. it becomes nearly black and a tarry deposit forms on the sides of the container.

The suitability of several of the inhibitors provided by the invention in the stabilization of 2-chlorobutene-2 is illustrated by the following examples, it being understood that the practice of the invention is not limited to the stabilization of this particular halobutene.

Example I 0.1% by volume of glycerol was added to a bottle of freshly prepared 2-chlorobutene-2 in which a strip of drum iron had been immersed. At the end of 44 days the Gardner scale reading on the liquid was less than unity and the strip was only very slightly effected. (On the Gardner scale No. 1 is water-white, No. 15 is dark brown.)

Example II

A standard one-gallon steel shipping drum was filled about one-half to one-third full of by-product 2-chlorobutene-2 to which had been added about 0.1% by volume of glycerol. The drum was allowed to remain exposed to the elements for ten months. At the end of this period examination was made of the container and its contents. The liquid poured from the drum absolutely clear and there was only a very light deposit on the walls of the drum. When a sample of the stored liquid was tested for color by the Gardner scale the reading was less than 1.

Example III

5% by volume of methyl glycerol ether was added to a bottle of freshly prepared 2-chlorobutene-2. There was no discoloration after 54 days.

We claim as our invention:

1. The method of stabilizing 2-chlorobutene-2 which comprises adding thereto about 0.1% by volume of glycerol.

2. The method of stabilizing 2-chlorobutene-2 which comprises adding thereto about 5% by volume of methyl glycerol ether.

3. The method of preventing the decomposition of 2-chlorobutene-2 which comprises adding thereto a stabilizing amount of a compound from the group consisting of glycerol and methyl glycerol ether.

4. As a composition of matter 2-chlorobutene-2 containing a stabilizing quantity of glycerol dissolved therein.

5. As a composition of matter 2-chlorobutene-2 containing a stabilizing quantity of methyl glycerol ether dissolved therein.

6. As a composition of matter 2-chlorobutene-2 having dissolved therein a stabilizing quantity of a compound from the group consisting of glycerol and methyl glycerol ether.

7. The method of preventing the decomposition of a 2-halobutene in which the olefinic linkage is in the 2-position which comprises adding thereto a stabilizing amount of a compound from the group consisting of glycerol and methyl glycerol ether.

8. As a composition of matter a 2-halobutene in which the olefinic linkage is in the 2-position having dissolved therein a stabilizing quantity of a compound from the group consisting of glycerol and methyl glycerol ether.

9. The method of preventing the decomposition of a monohalobutene in which the halogen atom is linked to an unsaturated carbon atom which comprises adding thereto a stabilizing amount of a compound from the group consisting of glycerol and methyl glycerol ether.

10. A composition of matter comprising a monohalobutene in which the halogen atom is linked to an unsaturated carbon atom and a quantity of a compound from the group consisting of glycerol and methyl glycerol ether.

11. The method of preventing the decomposition of a halobutene containing a halogen atom linked to an unsaturated carbon atom which comprises adding thereto a stabilizing amount of glycerol.

RUPERT C. MORRIS.
EDWARD C. SHOKAL.